United States Patent [19]

Kurosawa et al.

[11] Patent Number: 4,652,989
[45] Date of Patent: Mar. 24, 1987

[54] FREQUENCY CONVERTER APPARATUS

[75] Inventors: Ryoichi Kurosawa; Takeo Shimamura, both of Tokyo, Japan

[73] Assignee: Kabushiki Kaisha Toshiba, Kawasaki, Japan

[21] Appl. No.: 770,071

[22] Filed: Aug. 28, 1985

[30] Foreign Application Priority Data

Sep. 5, 1984 [JP] Japan .................................. 59-184523

[51] Int. Cl.$^4$ .......................................... H02M 5/257
[52] U.S. Cl. ..................................... 363/161; 318/808
[58] Field of Search ....................... 363/160, 161, 162; 318/807, 808, 809

[56] References Cited

U.S. PATENT DOCUMENTS

| | | | |
|---|---|---|---|
| 3,959,719 | 5/1976 | Espelage | 363/161 X |
| 3,967,173 | 6/1976 | Stich | 363/132 X |
| 4,361,791 | 11/1982 | Plunkett | 318/808 X |
| 4,371,920 | 2/1983 | Salzmann | 363/160 |
| 4,555,755 | 11/1985 | Kurosawa et al. | 363/160 |

FOREIGN PATENT DOCUMENTS 57-58865 12/1982 Japan .

Primary Examiner—Patrick R. Salce
Assistant Examiner—Marc S. Hoff
Attorney, Agent, or Firm—Oblon, Fisher, Spivak, McClelland & Maier

[57] ABSTRACT

A frequency converter apparatus is provided with a frequency converter coupled to an AC power supply and to a load. The frequency converter converts an AC input with a given input frequency into an AC output with a given output frequency. The frequency converter apparatus is further provided with a frequency reference circuit and a harmonic cancel circuit. The frequency reference circuit supplies a reference signal to the frequency converter so that the output frequency of the AC output follows the reference signal. The harmonic cancel circuit supplies a harmonic cancelling signal to the frequency reference circuit so that the prescribed order of the higher harmonic of the AC output is substantially cancelled according to the frequency, magnitude and phase of the harmonic cancelling signal.

14 Claims, 5 Drawing Figures

FREQUENCY CONVERTER APPARATUS

BACKGROUND OF THE INVENTION

The present invention relates generally to a frequency converter apparatus of a polyphase direct AC type conventionally employed for a variable voltage and variable frequency power source, which is suitable for operating a variable speed AC motor.

In recent years, a variable voltage and variable frequency power source is widely used for providing an AC motor with variable speed control, thereby avoiding various shortcomings of the commutator and brush of a DC motor, and achieving high-performance motor speed control.

When the power capacity of a motor is small, a power source provided for driving the motor is generally formed with a rectifier for converting AC power into DC power, and an inverter for converting the DC power into AC power with a desired voltage and frequency. Such an inverter is made of semiconductor power devices such as transistors, gate turn-off thyristors or the like, which are artificially switched to obtain the desired voltage and frequency.

On the other hand, when the handling power of a motor is relatively large, a direct frequency converter, called "cycloconverter," is often employed. This is because artificial switching for large power semiconductor devices is difficult in practice. With a cycloconverter, an AC output with an optional voltage and frequency can be obtained directly from AC power supply by means of power supply commutation, i.e., by switching the semiconductor devices with the power supply voltage.

Such a direct frequency converter, however, causes undesirable higher harmonics in the AC line of the power supply. The frequency of the higher harmonics vary depending on the frequency of the AC output supplied to a load (e.g., AC motor). This causes certain shortcomings in the conventional frequency converter.

Generally speaking, a high-power direct frequency converter has a polyphase input and polyphase output, as shown in FIG. 1, wherein the main circuit portion of a 3-phase input and 3-phase-output direct frequency converter (cycloconverter) is shown. The reference numeral 1 denotes a 3-phase AC power supply, the reference numerals 2, 3 and 4 denote power transformers, the reference numerals 5, 6 and 7 denote direct frequency converters, and the reference numeral 8 denotes an AC motor serving as a load. Each of the direct frequency converters is formed of two sets of 3-phase bridge-connected, controlled rectifiers, one set of which is antiparallel coupled to the other set, so that AC currents containing positive and negative components flow into the load.

The 3-phase bridged-connected, controlled rectifier circuit is also used to control a DC motor. In this case, although the load (motor) current is DC, natural numbered higher harmonics of 5th, 7th, 11th, 13th, - - - (i.e., $(6n\pm1)$th harmonics; n=natural number) are mixed in the fundamental frequency of the AC power supply.

The basic operation of a direct frequency converter is substantially the same as that of the above controlled rectifier circuit. The direct frequency converter only differs from the above 3-phase controlled rectifier circuit in that the load current and load voltage are AC and are varied, in the form of a sine wave according to the polarity of the load current, with the alternative switching of the antiparallel-connected 3-phase-bridged-connected, controlled rectifier circuit.

Thus, the AC power supply for the direct frequency converter is subjected to not only the above-mentioned natural numbered higher harmonics, but also to other higher harmonics depending on the load frequency.

Assume that the 3-phase power supply frequency is $f_{IN}$, the load frequency is $f_{OUT}$, and symbols n and m denote given natural numbers. Then, the frequency $f_H$ of the higher harmonics, depending on the load frequency, may be represented as:

$$f_H = (6n\pm1)f_{IN} \pm m \cdot f_{OUT} \quad (1)$$

The above equation holds even in a 3-phase (polyphase) output direct frequency converter, except that some of load frequency dependent higher harmonics of number m are automatically cancelled out.

Each natural numbered higher harmonic has a given fixed frequency. Accordingly, such a higher harmonic can be easily removed by means of a low-pass or band-rejection filter. However, the load frequency dependent higher harmonics cannot be easily removed because the frequency of such harmonics varies with changes in the load frequency. In particular, when a phase-advancing capacitor for improving the power factor is adapted to the power system, and if a reactor or the reactive component of a transformer is coupled in series to the phase-advancing capacitor, resonance due to the presence of the capacitor and reactor often occurs near a frequency 3 or 4 times higher than the power supply frequency. When such a resonance matches a certain load-frequency-dependent higher harmonic, even if the natural numbered higher harmonics themselves bring no problem, the resonance induced by the higher harmonic prominently distorts the waveform of the power supply voltage, thereby spoiling the normal operation of other equipment in the power system.

SUMMARY OF THE INVENTION

It is accordingly an object of the present invention to provide a frequency converter apparatus, in which a specific component of load-frequency-dependent higher harmonics, particularly harmful to the power system, is eliminated or cancelled so that the waveform distortion of the power supply voltage is minimized.

To achieve the above object, according to a frequency converter apparatus of the invention, an AC output from the apparatus is controlled to a value which corresponds to the combination (sum) of a voltage required to obtain a target AC load voltage and a sine wave voltage with a prescribed frequency fc. (This voltage combining control is performed such that no voltage change occurs in the AC output.) When the above frequency converter apparatus is provided for a 3-phase power system, load-frequency-dependent higher harmonics $f_{HC}$ contained in the AC output can be represented as:

$$f_{HC} = (6n\pm1)f_{IN} \pm l \cdot fc \quad (2)$$

where l denotes natural numbers. The frequency, magnitude (amplitude) and phase of the sine wave voltage of frequency fc are so determined that the harmful component of the load-frequency-dependent higher harmonics is cancelled by the main component (generally l=1) of the harmonics $f_{HC}$.

The frequency for effecting the above cancelling can be determined according to the following relation, which is derived from Eqs. (1) and (2), provided that $f_{HC}=f_H$ and $l=1$:

$$fc = m \cdot f_{OUT} \qquad (3)$$

The number of m in Eq. (3) is determined in accordance with the order of the load-frequency-dependent higher harmonics to be eliminated or cancelled. Namely, the frequency fc is selected to be m times higher than the load frequency $f_{OUT}$.

In practice, it is difficult to mathematically determine the magnitude and phase of the sine wave voltage for said cancelling. From this, a prescribed function representing a relation between the load voltage/load power factor and the magnitude/phase of the sine wave voltage may be obtained in advance according to a predetermined computer simulation or the like method, and such a prescribed function is used to determine the magnitude and phase of the sine wave voltage for the cancelling.

DETAILED DESCRIPTION OF THE PREFERRED EMBODIMENTS

In the following a frequency converter apparatus according to an embodiment of the present invention will be described in detail, with reference to the accompanying drawings.

Figure 1:
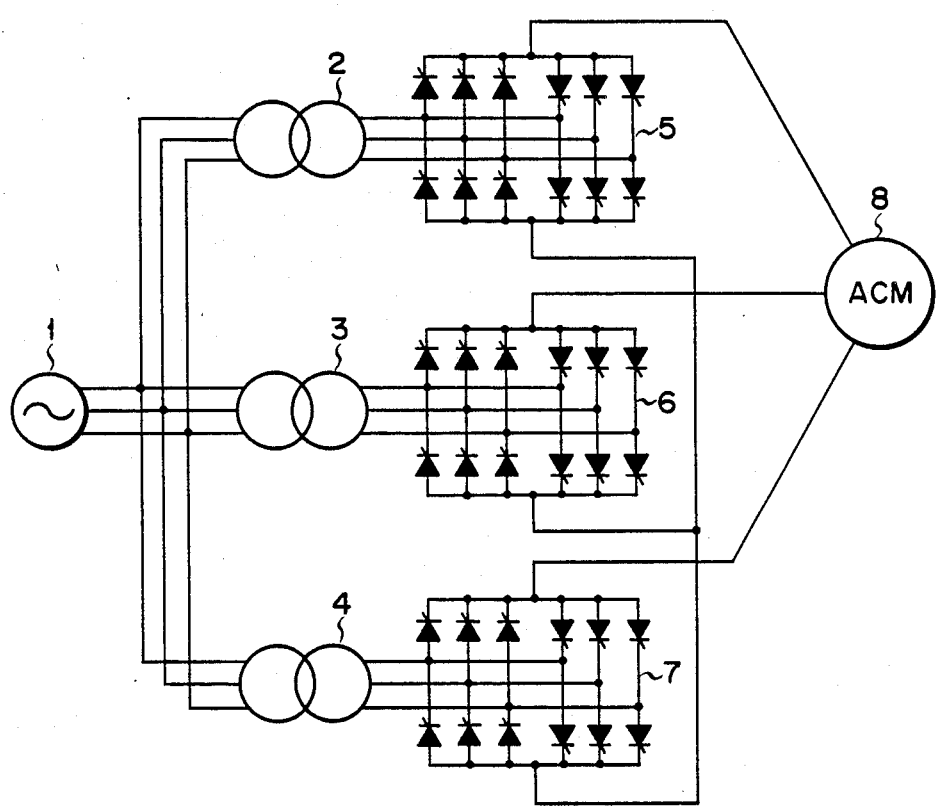
FIG. 1 shows a configuration of the main circuit portion of a conventional direct frequency converter.
Figure 2:
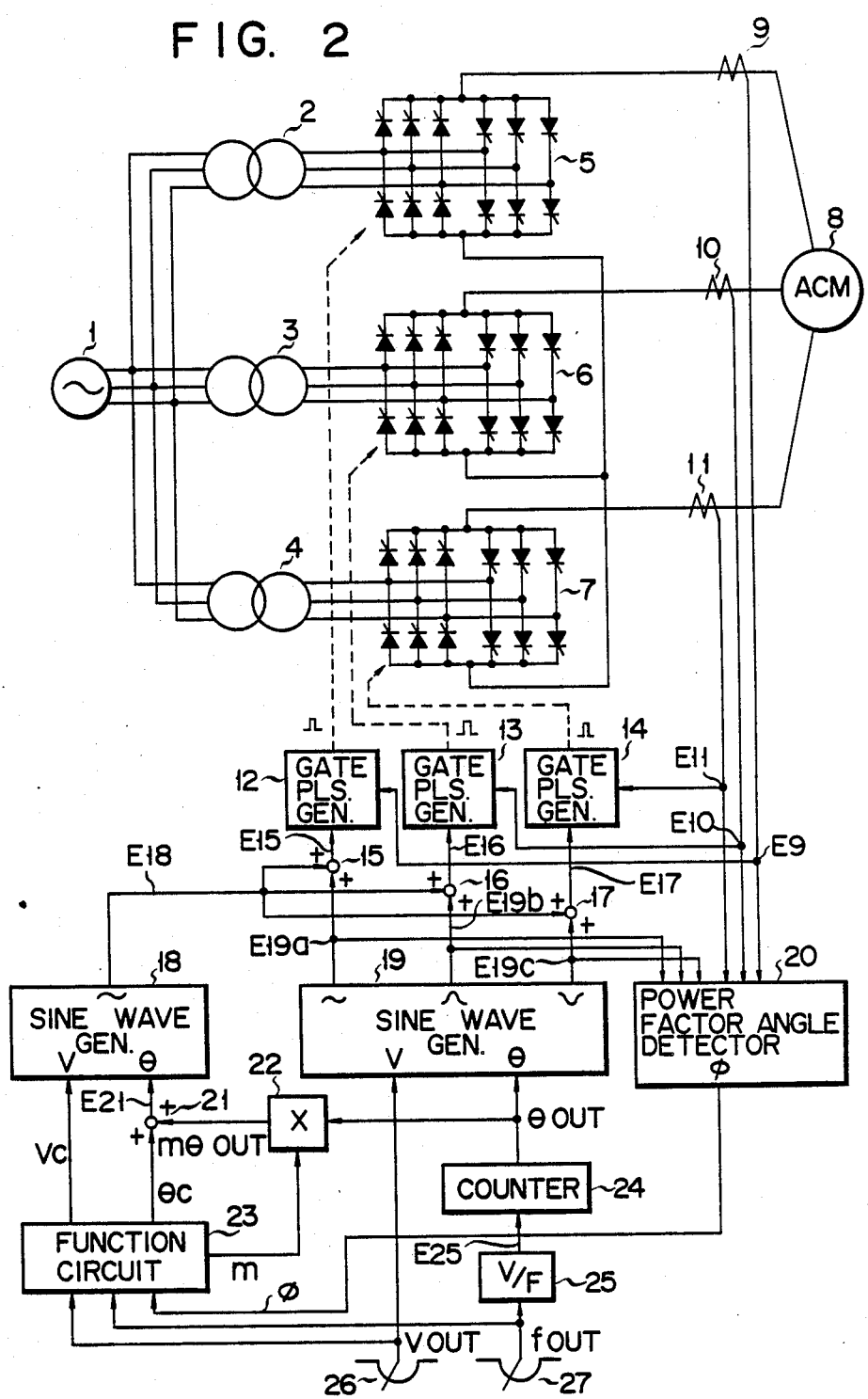
FIG. 2 is a block diagram showing a frequency converter apparatus according to an embodiment of the present invention.

FIG. 2 shows a circuit configuration of the embodiment. In FIG. 2, the reference numerals 1 to 8 denote the same main circuit portion as those shown in FIG. 1. The reference numerals 18 and 19 denote sine wave generators. Generator 18 generates a single-phase sine wave output E18 according to a voltage input Vc and phase input E21. Generator 19 generates 3-phase sine wave outputs E19a, E19b and E19c according to a voltage input $V_{OUT}$ and phase input $\theta_{OUT}$. Generators 18 and 19 may be conventional generators. For instance, model DTM 1716/1717 Digital Vector Generator manufactured by ANALOG DEVICES Co. (USA) may be used for each of sine wave generators 18 and 19.

3-phase outputs E19a, E19b and E19c from generator 19 are supplied to adders 15, 16 and 17, respectively. Each of adders 15, 16 and 17 also receives single-phase output E18 from generator 18. Then, added results E15, E16 and E17 from adders 15, 16 and 17 are supplied to gate pulse generators 12, 13 and 14, respectively. Generators 12, 13 and 14 also receive current signals E9, E10 and E11 respectively from current transformers 9, 10 and 11. Current transformers 9, 10 and 11 are coupled to the 3-phase output current paths of the frequency converter.

Gate pulse generators 12, 13 and 14 supply gate pulses to thyristors of respective direct frequency converters 5, 6 and 7. The supply of these gate pulses is controlled according to the contents of added results E15, E16 and E17 and the polarities of current signals E9, E10 and E11. (Each polarity of current signals E9, E10 and E11 represents the direction of the flow of each load current.)

The power factor of the load current supplied to AC motor 8 is detected by a power factor angle detector 20. Detector 20 calculates a power factor angle $\phi$ based on 3-phase sine wave voltage references E19a to E19c and current signals E9 to E11 from current transformers 9 to 11. An output signal from detector 20, which represents the detected power factor $\phi$ of the load (motor 8), is supplied to a function circuit 23. Circuit 23 also receives a preset voltage $V_{OUT}$ from a voltage setting potentiometer 26, and a preset frequency $f_{OUT}$ from a frequency setting potentiometer 27. Circuit 23 generates a superposing voltage amplitude Vc and superposing phase $\theta c$ in accordance with $\phi$, $V_{OUT}$ and $f_{OUT}$. Circuit 23 also generates data of the order m in Eq. (1).

Preset frequency $f_{OUT}$ from potentiometer 27 is supplied to a voltage-to-frequency (V/F) converter 25. V/F converter 25 generates a pulse signal E25 having a frequency proportional to the potential of $f_{OUT}$. Signal E25 is supplied to a counter 24. Counter 24 accumulates the number of pulses of signal E25, and generates superposing phase $\theta_{OUT}$. The relation between $\theta_{OUT}$ and $f_{OUT}$ is defined as:

$$\theta_{OUT} = \int 2\pi f_{OUT} dt \qquad (4)$$

Phase $\theta_{OUT}$ thus obtained is supplied to a multiplier 22. Multiplier 22 also receives the data of order m from function circuit 23, and provides data $m \cdot \theta_{OUT}$. Data $m \cdot \theta_{OUT}$ from multiplier 22 and phase $\theta c$ from function circuit 23 are added in an adder 21. Then, adder 21 provides said phase input E21 representing $m \cdot \theta_{OUT} + \theta c$.

The circuit elements 9 to 27 in FIG. 2 constitute a control circuit of the frequency converter apparatus.

Sine wave generator 19 generates the following 3-phase sine wave voltage references:

$$\begin{aligned} E19a &= V_{OUT} \cdot \sin \theta_{OUT} \\ E19b &= V_{OUT} \cdot \sin (\theta_{OUT} - \tfrac{2}{3}\pi) \\ E19c &= V_{OUT} \cdot \sin (\theta_{OUT} - 4/3\pi) \end{aligned} \qquad (5)$$

wherein $V_{OUT}$ defines each 3-phase output voltage, and $\theta_{OUT}$ defines each output voltage phase. In this case, current signals E9 to E11 from current transformers 9 to 11 may be represented as:

$$\begin{aligned} E9 &= I \cdot \sin(\theta_{OUT} + \phi) \\ E10 &= I \cdot \sin(\theta_{OUT} + \phi - \tfrac{2}{3}\pi) \\ E11 &= I \cdot \sin(\theta_{OUT} + \phi - 4/3\pi) \end{aligned} \qquad (6)$$

wherein I denotes the amplitude of each of the load currents, and $\phi$ denotes the angle of power factor.

The amplitude, frequency and phase of sine wave output E18 from single-phase sine wave generator 18 are so determined as follows.

Function circuit 23 receives power factor angle $\phi$ from detector 20, preset voltage $V_{OUT}$ from potentiometer 26, and preset frequency $f_{OUT}$ from potentiometer 27. Circuit 23 provides, according to a given manner, the data of order m of the load frequency dependent higher harmonic which is to be cancelled or eliminated and which depends on preset frequency $f_{OUT}$. This order m is determined by the relation of Eq. (1). Circuit 23 also provides a superposing voltage amplitude Vc and superposing phase $\theta c$ both of which are used to achieve the cancellation of the target higher harmonic. These Vc and $\theta c$ are obtained from preset voltage $V_{OUT}$ and power factor angle $\phi$.

Phase input E21 ($=\theta c + m \cdot \theta_{OUT}$) from adder 21 and superposing voltage amplitude Vc from circuit 23 are supplied to single-phase sine wave generator 18, so that the amplitude, frequency and phase of sine wave E18 generated therefrom are determined. Thus, the generated sine wave E18 can be represented by Vc·sin ($m \cdot \theta_{OUT} + \theta c$) whose frequency is m times higher than preset frequency $f_{OUT}$.

The function of the order m with respect to preset frequency $f_{OUT}$, which is preset in function circuit 23, is responsive to the change of the order m of harmful load-frequency-dependent higher harmonics. This m order harmonic causes resonance due to change of $f_{OUT}$.

Incidentally, when only a given prefixed harmonic order is to be cancelled, the function of the order m is constant. In this case, no operation to obtain such a constant function is required.

Figure 3:
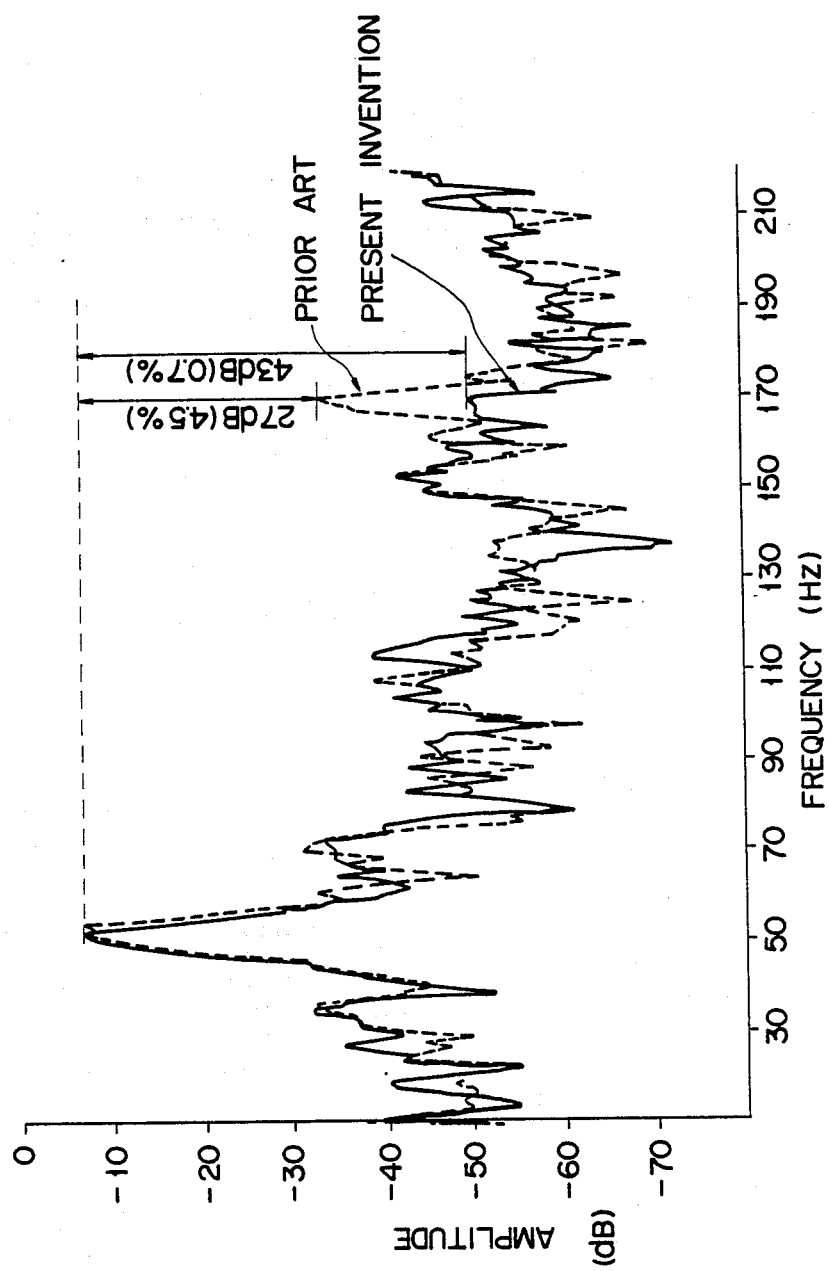
FIG. 3 shows amplitude/frequency characteristics of power supply currents, one of which is obtained by the embodiment of FIG. 2, while the other of which is obtained by the conventional direct frequency converter shown in FIG. 1.

FIG. 3 shows amplitude/frequency characteristics of power supply currents, one of which is obtained by the cycloconverter of FIG. 2, while the other of which is obtained by the conventional one as shown in FIG. 1. The reference level (0 dB) of the amplitude axis is determined by the measurement equipment used for obtaining the characteristic of FIG. 3. The higher harmonic characteristic of the solid line is obtained by the FIG. 2 converter, while the higher harmonic characteristic of the broken line is obtained by the FIG. 1 converter which lacks the circuit elements 15–18 and 20–23 of the FIG. 2 embodiment. The characteristics of FIG. 3 were obtained under the condition that a 3-phase induction motor (300 kW, 6poles, 300 rpm ratings) was controlled by the cycloconverter of FIG. 1 or 2, provided that $f_{OUT}$=9 Hz, $\phi$=30 degrees, $V_{OUT}$= 55% of the maximum output voltage and $f_{IN}$=50 Hz.

FIG. 3 demonstrates the harmonic cancelling effect of the FIG. 2 embodiment. The amplitude of the target harmful harmonic of frequency $f_H$ (169 Hz) obtained in the case of FIG. 2 is smaller by approximately 1/6 (−16 dB) than that obtained in the case of FIG. 1.

The cancelling harmonic frequency $f_H$=169 Hz can be calculated from Eq. (1) under the condition that n=1, m=9, $f_{IN}$=50 Hz and $f_{OUT}$=9 Hz:

$$f_H = (6n - 1)f_{IN} - m \cdot f_{OUT}$$
$$= (6 - 1) \times 50 - 9 \times 9$$
$$= 250 - 81 = 169 \text{ (Hz)}$$

With the above-mentioned frequency converter apparatus of the invention, it is possible to eliminate harmful components of the load frequency dependent higher harmonics, without substantially changing the main circuit portion. In addition, since the same sine wave E18 is equally added or superposed onto respective 3-phase sine wave outputs E19a to E19c, each phase voltage applied to the 3-phase load is not changed by the use of sine wave E18. Further, when the neutral point of the 3-phase outputs of the converter is disconnected from the neutral point of the 3-phase load, no change is involved in the output current.

Thus, the present invention protects the power system and/or its associated equipment from the influence of higher harmonics generated by a direct frequency converter apparatus such as a cycloconverter, thereby making possible the application of a direct frequency converter apparatus to a large capacity AC motor control, etc.

Figure 4:
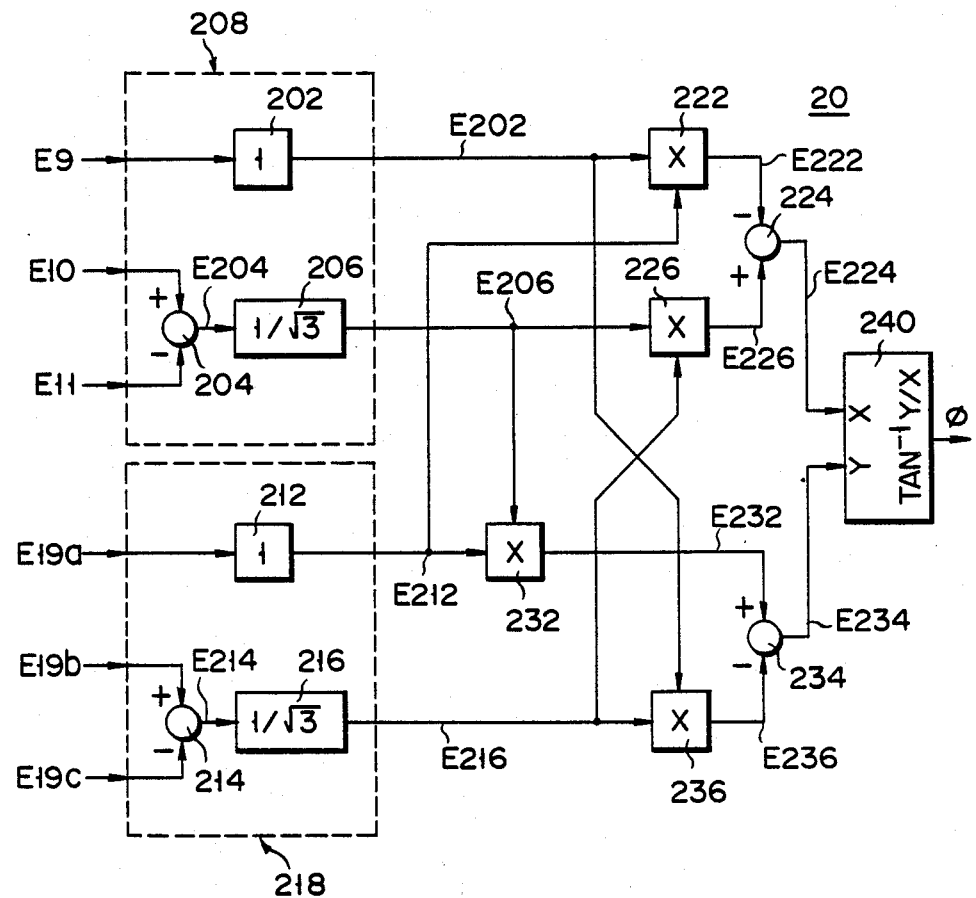
FIG. 4 is a block diagram showing details of the power factor angle detector (20) in FIG. 2.

FIG. 4 is a block diagram showing details of the power factor angle detector 20 in FIG. 2. Current signal E9 from current transformer 9 is supplied to a coefficient amplifier 202 with a unit gain. Amplifier 202 provides a signal E202 representing I·sin ($\theta_{OUT}+\phi$). Current signal E10 from current transformer 10 is supplied to the positive input of a subtracter 204 whose negative input receives current signal E11 from current transformer 11. Subtracter 204 provides a signal E204, representing (E10−E11), to a coefficient amplifier 206. The gain of amplifier 206 is $1/\sqrt{3}$. Amplifier 206 provides a signal E206 representing −I·sin ($\theta_{OUT}+\phi$).

The circuit elements 202 to 206 constitute a 3-phase/2-phase converter 208.

Sine wave voltage reference E19a from 3-phase sine wave generator 19 is supplied to a coefficient amplifier 212 with a unit gain. Amplifier 212 provides a signal E212 representing $V_{OUT}$sin $\theta_{OUT}$. Sine wave voltage reference E19b from generator 19 is supplied to the positive input of a subtracter 214 whose negative input receives sine wave voltage reference E19c from generator 19. Subtracter 214 provides a signal E214, representing (E19B−E19c), to a coefficient amplifier 216. The gain of amplifier 216 is $1/\sqrt{3}$. Amplifier 216 provides a signal E216 representing $-V_{OUT}$sin $\theta_{OUT}$.

The circuit elements 212 to 216 constitute a 3-phase/2-phase converter 218.

Signals E202 and E212 are supplied to a multiplier 222. Multiplier 222 provides a signal E222 representing I·sin ($\theta_{OUT}+\phi$)×$V_{OUT}$sin $\theta_{OUT}$. Signals E206 and E216 are supplied to a multiplier 226. Multiplier 226 provides a signal E226 representing −I·sin ($\theta_{OUT}+\phi$)×−$V_{OUT}$sin $\theta_{OUT}$. Signals E206 and E212 are supplied to a multiplier 232. Multiplier 232 provides a signal E232 representing −I·sin ($\theta_{OUT}+\phi$)×$V_{OUT}$sin $\theta_{OUT}$. Signals E202 and E216 are supplied to a multiplier 236. Multiplier 236 provides a signal E236 representing I·sin ($\theta_{OUT}+\phi$)×−$V_{OUT}$sin $\theta_{OUT}$.

Signal E222 is subtracted from signal E226 in a subtracter 224. Subtracter 224 provides a signal E224 representing I·$V_{OUT}$cos $\phi$. Signal E236 is subtracted from signal E232 in a subtracter 234. Subtracter 234 provides a signal E234 representing E·$V_{OUT}$sin $\phi$. Signals E224 and E234 are supplied to a function converter 240. Converter 240 calculates the function of $\tan^{-1}$ (E234/E224). Then, power factor angle $\phi$ is obtained from converter 240.

Figure 5:
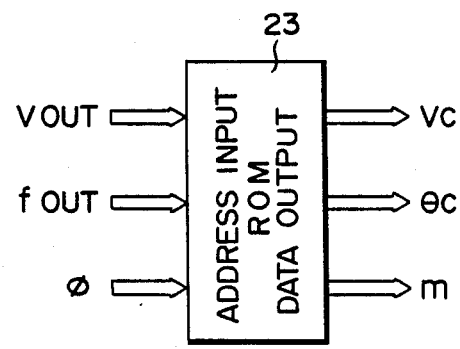
FIG. 5 shows an example of the function circuit (23) in FIG. 2.

FIG. 5 shows an example of function circuit 23 in FIG. 2. When each amount of $V_{OUT}$, $f_{OUT}$ and $\phi$ is to be divided into 16 segments, each of $V_{OUT}$, $f_{OUT}$ and $\phi$ may be represented by 4 bit data. In this case, 12 bit (=4 bit×3) data of $V_{OUT}$, $f_{OUT}$ and $\phi$ are used for specifying the address of a memory 23 serving as a code converter. A ROM having a memory capacity of 4096×12 bits may be used for such a code converter. The contents of this ROM are predetermined according to the relations of Eqs. (1) to (3) and the circuit design of the FIG. 2 apparatus. Data of Vc, $\theta$c and m are obtained from the specified addresses of ROM 23.

While the invention has been described in connection with what is presently considered to be the most practical and preferred embodiment, it is understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent structures.

What is claimed is:

1. A frequency converter apparatus comprising:
   frequency converter means to be coupled to an AC power supply and to a load, for converting an AC input with an input frequency from said AC power supply into polyphase AC outputs with an output frequency;
   frequency reference means for providing polyphase reference signals to said frequency converter means so that said polyphase AC outputs follow said reference signals; and
   harmonic cancel means coupled to said frequency reference means for providing a harmonic cancelling signal and for mixing said harmonic cancelling with said polyphase reference signals, said harmonic cancelling signal modifying each said polyphase AC output so that a higher harmonic of a prescribed order generated in said AC output is reduced or cancelled.

2. A frequency converter apparatus comprising:
   frequency converter means to be coupled to an AC power supply and to a load, for converting an AC input with an input frequency into an AC output with an output frequency;
   frequency reference means for providing a reference signal to said frequency converter means so that the output frequency of said AC output follows said reference signal; and
   harmonic cancel means for providing a harmonic cancelling signal to said frequency reference means so that the higher harmonic of a prescribed order in said AC output is reduced or cancelled according to said harmonic cancelling signal;
   wherein said harmonic cancelling signal has a frequency corresponding to said output frequency, and the magnitude and phase of said harmonic cancelling signal are determined in accordance with a magnitude of said AC output and with an angle of power factor of said load.

3. A frequency converter apparatus comprising:
   frequency converter means to be coupled to an AC power supply and to a load, for converting an AC input with an input frequency into an AC output with an output frequency;
   frequency reference means for providing an reference signal to said frequency converter means so that the output frequency of said AC output follows said reference signal; and
   harmonic cancel means for providing a harmonic cancelling signal to said frequency reference means so that the higher harmonic of a prescribed order in said AC output is reduced or cancelled according to said harmonic cancelling signal;
   wherein said frequency converter means includes a polyphase direct AC converter for converting polyphase AC inputs into polyphase AC outputs; and wherein said frequency reference means includes:
   voltage set means for providing a voltage set signal which corresponds to the magnitude of said AC output;
   frequency set means for providing a frequency set signal which corresponds to said output frequency;
   converter means coupled to said frequency set means for converting said frequency set signal into a phase signal; and
   polyphase sine wave generator means coupled to said voltage set means, said frequency set means and said converter means, for generating a plurality of polyphase reference signals in accordance with said voltage set signal and said phase signal, each of said plural polyphase reference signals serving as said reference signal so that said polyphase AC outputs follow said polyphase reference signals.

4. A frequency converter apparatus according to claim 2, wherein said frequency converter means includes a polyphase direct AC converter for converting polyphase AC inputs into polyphase AC outputs; and wherein said frequency reference means includes:
   voltage set means for providing a voltage set signal which corresponds to the magnitude of said AC output;
   frequency set means for providing a frequency set signal which corresponds to said output frequency;
   converter means coupled to said frequency set means for converting said frequency set signal into a phase signal; and
   polyphase sine wave generator means coupled to said voltage set means, said frequency set means and said converter means, for generating a plurality of polyphase reference signals in accordance with said voltage set signal and said phase signal, each of said plural polyphase reference signals serving as said reference signal so that said polyphase AC outputs follow said polyphase reference signals.

5. A frequency converter apparatus according to claim 3, wherein said harmonic cancel means includes:
   power factor means coupled to said frequency converter means and said frequency reference means, for detecting the angle of said power factor, in accordance with said polyphase reference signals and currents flowing into said load, and providing a power factor angle signal representing the power factor of said load;
   circuit means coupled to said power factor means, said converter means, said voltage set means and said frequency set means, for producing said harmonic cancelling signal according to the value of each of said power factor angle signal, said voltage set signal and said frequency set signal; and
   adder means coupled to said circuit means and said frequency reference means, for adding said harmonic cancelling signal to each of said polyphase reference signals, and providing modified polyphase reference signals respectively corresponding to said polyphase reference signals, said modified polyphase reference signals being supplied to said frequency converter means so that the output frequency and the magnitude of said AC output follow said modified polyphase reference signals.

6. A frequency converter apparatus according to claim 4, wherein said harmonic cancel means includes:
   power factor means coupled to said frequency converter means and said frequency reference means, for detecting the angle of said power factor, in accordance with said polyphase reference signals and currents flowing into said load, and providing a power factor angle signal representing the power factor of said load;
   circuit means coupled to said power factor means, said converter means, said voltage set means and said frequency set means, for producing said harmonic cancelling signal according to the value of each of said power factor angle signal, said voltage set signal and said frequency set signal; and
   adder means coupled to said circuit means and said frequency reference means, for adding said harmonic cancelling signal to each of said polyphase reference signals, and providing modified polyphase reference signals respectively corresponding to said polyphase reference signals, said modified polyphase reference signals being supplied to said frequency converter means so that the output frequency and the magnitude of said AC output follow said modified polyphase reference signals.

7. A frequency converter apparatus according to claim 5, wherein said circuit means includes:
   function means coupled to said power factor means, said voltage set means and said frequency set means, for detecting said prescribed order in accordance with said input frequency, said output frequency and the frequency of said higher harmonic to be cancelled.

8. A frequency converter apparatus according to claim 6, wherein said circuit means includes:
   function means coupled to said power factor means, said voltage set means and said frequency set means, for detecting said prescribed order in accordance with said input frequency, said output frequency and the frequency of said higher harmonic to be cancelled.

9. A frequency converter apparatus according to claim 7, wherein said circuit means further includes:
   multiplier means coupled to said function means and said converter means, for multiplying said phase signal by said prescribed order to provide phase data on which the frequency and phase of said harmonic cancelling signal depend.

10. A frequency converter apparatus according to claim 8, wherein said circuit means further includes:
    multiplier means coupled to said function means and said converter means, for multiplying said phase signal by said prescribed order to provide phase data on which the frequency and phase of said harmonic cancelling signal depend.

11. A frequency converter apparatus according to claim 9, wherein said circuit means further includes:
    single-phase sine wave generator means coupled to said multiplier means for generating said harmonic cancelling signal based on said phase data.

12. A frequency converter apparatus according to claim 10, wherein said circuit means further includes:
    single-phase sine wave generator means coupled to said multiplier means for generating said harmonic cancelling signal based on said phase data.

13. A frequency converter apparatus according to claim 3, wherein said frequency converter means includes a 3-phase cycloconverter.

14. A frequency converter apparatus according to claim 4, wherein said frequency converter means includes a 3-phase cycloconverter.

* * * * *